3,051,577
GLYCERYL LACTO ESTERS IN COATINGS

Vigen K. Babayan, Livingston, and George Newell Comes, Denville, N.J., assignors to Drew Chemical Corporation, a corporation of Delaware
No Drawing. Filed July 2, 1959, Ser. No. 824,470
9 Claims. (Cl. 99—118)

The present invention is directed to compositions of edible nature and more particularly to additives to confectionary coatings whereby their properties are improved.

Chocolate and other confectionary coatings made from hard butters have suffered from the blooming, greying and dulling effect of the candy surface. A variety of reasons and explanations have been advanced to explain the loss of gloss. Particularly in confectionary coatings, a number of additives have been used to eliminate or minimize the loss of gloss on storage. Among the types of additives suggested have been mono- and di-glycerides of fatty acids, sorbitol esters, ethoxylated polyol esters, phosphates and lecithin. To some extent improvements have been noted by the use of one or more of these additives in the preparation of confectionary coatings. There remains a good deal of room however, for a satisfactory coating able to withstand all conditions encountered in the trade, such as storage, high temperatures, and low temperatures. There has always been one or more factors which nullified any advantages the product may have been able to impart. Glucoside esters, for example, have been shown to impart gloss to confectionary coatings but their color, flavor and odor have not been completely satisfactory. The difficulty of producing a pure enough glucoside ester for this use has been thus far uneconomical.

It is among the objects of the present invention to overcome the disadvantages of prior compositions of the type described and to provide confectionary coatings which are stable and have a high gloss and which do not lose their gloss with lapse of time.

It is also among the objects of the invention to introduce an additive to such compositions which will impart desirable flavor, taste, odor and palatability to the coatings.

In practicing the invention there is provided a hard butter which is usually the triglyceride mixed esters principally of higher fatty acids having 12 to 18 carbon atoms. To such hard butter there is added a minor proportion of the glyceryl lacto fatty acid esters which esters are prepared by reaction of glycerine lactic acid and a fatty acid. Products coming in the scope of this invention but not excluding other similar methods and products are described in the patent of Barsky, U.S. No. 2,509,414.

These esters may be prepared from the fatty acids or the corresponding monoglycerides depending on the economics of the situation. These esters are of fatty acids having 10 to 24 carbon atoms and mixtures thereof. They may be saturated or unsaturated and constitute from 0.5 mole to 3 moles based on the ratio of glycerine to lactic acid.

For hard butters made by the esterification of specific fatty acids with glycerine (reconstituted esters) the lacto oleate ester gave the most satisfactory gloss (initial and permanent). Although the other esters all do contribute gloss and are an improvement over a blank experiment having no glyceryl lacto fatty acid ester additive, nevertheless the performance of the type noted was distinctly superior than the rest. For hard butters made by the disproportionation of fatty oils, glyceryl lacto oleate ester appeared to give the best gloss results; again, the other esters appear to give better results than the corresponding blank but the oleate mentioned was superior. For hard butters made by the rearrangement of a coconut type fat with a vegetable oil having essentially $C_{16}$ and $C_{18}$ fatty acids, the high hydroxyl containing lacto palmitate ester (high monoglyceride content) proved to be outstanding. For hard butters of mixed types combining a variety of raw materials in its composition specific advantages were noted in high hydroxyl containing lacto palmitate ester (high monoglyceride content). For hard butters compatible with cocoa butter and chocolate liquor, the glyceryl lacto oleate ester was very distinctly superior to the other glyceryl lacto fatty acid esters tried.

In the above experiments percentages from 1% to 10% of the esters were tried. The most significant results were found above 1% and below 5%. If one is satisfied with less significant improvement, however, even percentages of 0.5% gave visible improvement over the blank. In products which it is desired to disperse in water or emulsify readily, the incorporation of the high percentages of glyceryl lacto fatty acid esters was found to be advantageous.

The broad class of glyceryl lacto fatty acid esters is available from $C_{10}$ to $C_{24}$ fatty acids, saturated and unsaturated, and from mono to tri esters. Each ester has rather specific characteristics and can function best in a formulation best suited for those specific characteristics. Thus the lacto oleate esters of glycerine are outstanding in imparting gloss to the hard butters having a high softening point, as well as being specific for the cocoa butter compatible hard butters. The high hydroxyl containing lacto fatty acid esters (high monoglyceride content) are most useful for the rearranged, mixed types. The utility and advantages shown by the glyceryl lacto fatty acid esters are not limited to the hard butters and confectionary coatings. It has been found that such esters can advantageously be added to cocoa butter, chocolate liquor and chocolate per se to obtain better and more permanent gloss, smoother blending and retarding of bloom.

The glyceryl lacto fatty acid esters of $C_{14}$ to $C_{24}$ saturated fatty acids are solids and can be added either to the melted hard butter or cocoa butter and mixed. The glyceryl lacto fatty acid esters of $C_{12}$ and below and the unsaturated fatty acid esters are liquid; they can be mixed even in the cold by kneading or churning. From the standpoint of stability, color, odor, etc. the glyceryl lacto fatty acid esters of the saturated fatty acids from $C_{14}$ to $C_{24}$ are to be preferred.

A confectionary coating usually contains about 25% to 40% of hard butter, the remainder being a mixture of sugar, milk solids, flavoring and other constituents. The additive is ordinarily introduced into the hard butter before compounding with the other ingredients.

The following is a specific example of a coating composition made in accordance with the present invention:
200 parts by weight of 197.5 parts of hard butter and 2.5 parts of a glyceryl lacto fatty acid ester are mixed with 400 parts by weight of a mixture of sugar, cocoa and flavoring. 1.25 parts by weight of lecithin are introduced and mixed for two hours at 140° F. in a Hobart mixer. The batch is then transferred to a stainless steel mixing bowl. The material is tempered by alternately dipping the bowl in cool water and recovering, while the mix is being stirred constantly. When the coating has become quite heavy, cooling is discontinued, and the bowl is dipped in warm water while stirring, until the coating is thin enough to be used. The coating is used to then enrobe eight marshmallows, and eight molded bars are cast. The coated and cast pieces are then stored three days before being evaluated.

The evaluations are conducted as follows:

(1) The pieces are observed and the gloss recorded under "Room Temperature Storage."

(2) Two of the enrobed and two of the cast pieces are placed on foil, and alternately placed in a 90° F. oven for 45 minutes, and at room temperature a minimum of 2 hours. This procedure is repeated for a total of six cycles. The gloss is recorded after pieces have reached room temperature under "Heat Test."

(3) Two of the enrobed and two of the cast pieces are placed on foil, and alternately placed in a 90° F. oven for 45 minutes, then in a 32° F. refrigerator one hour, then at room temperature for a minimum of two hours. The gloss is recorded after pieces have reached room temperature. This procedure is repeated for a total of six cycles, and results recorded under "Heat-Cool Test." The gloss as recorded in the above tests is listed "Ex" for excellent, "G" for good, "F" for fair, and "P" for poor. Poor is the point at which the piece has lost all gloss, or is badly bloomed.

The following table shows typical results obtained by the above tests using various hard butters.

| Type of GLFAE [1] | Percent in Hard Butter | Gloss | | |
|---|---|---|---|---|
| | | Initial gloss | After 6th heat | After 6th Heat and Cooling |
| Blank | 0 | Ex/Ex | G/F | F/F |
| Oleate | 1 | Ex/Ex | Ex/G | G/G |
| | 2 | Ex/Ex | Ex/G+ | G+/G+ |
| | 5 | Ex/Ex | Ex/G+ | G+/G+ |
| | 10 | Ex/Ex | Ex/G | G/G |
| Palmitate | 1 | Ex/Ex | Ex/G | G/G |
| | 2 | Ex/Ex | Ex/G+ | G+/G+ |
| | 5 | Ex/Ex | Ex/G+ | G+/G+ |
| Stearate | 2 | Ex/Ex | Ex/F+ | G/G |
| Laurate | 2 | Ex/Ex | Ex/F+ | G/G |
| Tallow | 2 | Ex/Ex | Ex/F+ | G/G |
| Cottonseed | 2 | Ex/Ex | Ex/G | G/G |
| Low mono GLP [2] | 2 | Ex/Ex | Ex/G | G+/G+ |
| High mono GLP | 2 | Ex/Ex | Ex/G | G+/G+ |
| Cocoa coating GLP | 2 | Ex/Ex | Ex/G | G/G |
| Liquor coating GLP | 2 | Ex/Ex | Ex/G | G/G |

[1] Glyceryl lacto fatty acid ester.
[2] Glyceryl lacto palmitate.

In cocoa butter products, glyceryl lacto fatty acid esters show up well and improve the gloss of chocolate. The glyceryl lacto palmitate is particularly effective for this purpose.

For cream fillings and dispersible chocolate coating products, 5% and even 10% of the glyceryl lacto fatty acid esters were added to hard butters and they were then formulated with sugar, cocoa, flavorings etc. Such products not only have shown advantageous gloss characteristics on thin surfaces but also have lent themselves to making creams, emulsions and whipped products for confectionary and baking uses. The use of higher percentages is very advantageous where a gas such as air or nitrogen, water or other ingredients are to be incorporated and entrained in the plastic fat.

What is claimed is:

1. A hard butter comprising a hard fat and a minor proportion of an ester of glycerine, lactic acid and a fatty acid, said ester being of fatty acids having 10 to 24 carbon atoms, and having at least one hydroxyl group of the glycerine esterified with lactic acid.

2. A hard butter comprising a hard fat and a glyceryl lacto fatty acid ester, said ester being of fatty acids having 10 to 24 carbon atoms, the amount of ester present being about .5 to 10% based on said hard fat.

3. A hard butter containing therein a minor proportion of an ester glycerine, a fatty acid having from 10 to 24 carbon atoms and lactic acid.

4. A stable glossy enrobing composition containing a hard fat comprising the triglycerides of fatty acids having 12 to 18 carbon atoms, having incorporated in said fat about .5% to about 10% of mono- and di-glycerides of fatty acids having 10 to 24 carbon atoms, said mono- and di-glycerides being esterified with lactic acid to form triglycerides with the OH groups of said lactic acid being free, whereby stable gloss is imparted to said coating.

5. A stable glossy enrobing composition according to claim 4 characterized in that the fatty acids in said mono- and di-glycerides have 16 and 18 carbon atoms.

6. A stable glossy enrobing composition according to claim 4 characterized in that the amount of said lactic acid esters is about 1% to 5% of said hard fat.

7. A hard butter comprising a hard fat and a minor proportion of an ester of glycerine, lactic acid and a fatty acid, said fatty acid having from 10 to 24 carbon atoms, at least one hydroxyl group of said glycerine esterified with lactic acid, and the lactic acid hydroxyl groups being free.

8. A hard butter comprising a hard fat and a glyceryl lacto fatty acid ester, said ester being of fatty acids having 10 to 24 carbon atoms, the amount of said ester in said butter being about 0.5 to 10.0% based on said hard fat, the lactic acid hydroxyl groups being free.

9. A hard butter containing a minor proportion of an ester of glycerine, a fatty acid having from 10 to 24 carbon atoms and lactic acid, the lactic acid hydroxyl groups being free.

References Cited in the file of this patent
UNITED STATES PATENTS

| 2,509,414 | Barsky | May 30, 1950 |
| 2,690,971 | Iveson et al. | Oct. 5, 1954 |
| 2,864,705 | Schulman | Dec. 16, 1958 |